(12) United States Patent
Detal et al.

(10) Patent No.: US 10,110,641 B2
(45) Date of Patent: Oct. 23, 2018

(54) ESTABLISHING A DATA TRANSFER CONNECTION

(71) Applicant: UNIVERSITE CATHOLIQUE DE LOUVAIN, Louvain-la-Neuve (BE)

(72) Inventors: Gregory Detal, Mont-Saint-Guibert (BE); Olivier Bonaventure, Gembloux (BE); Christoph Paasch, St. Vith (BE)

(73) Assignee: UNIVERSITE CATHOLIQUE DE LOUVAIN, Louvain-la-Neuve (BE)

( * ) Notice: Subject to any disclaimer, the term of this patent is extended or adjusted under 35 U.S.C. 154(b) by 90 days.

(21) Appl. No.: 15/102,442

(22) PCT Filed: Dec. 8, 2014

(86) PCT No.: PCT/EP2014/076942
§ 371 (c)(1),
(2) Date: Jun. 7, 2016

(87) PCT Pub. No.: WO2015/086543
PCT Pub. Date: Jun. 18, 2015

(65) Prior Publication Data
US 2016/0315976 A1 Oct. 27, 2016

(30) Foreign Application Priority Data

Dec. 9, 2013 (EP) .................................... 13196340

(51) Int. Cl.
*G06F 15/16* (2006.01)
*H04L 29/06* (2006.01)
(Continued)

(52) U.S. Cl.
CPC .......... *H04L 65/1069* (2013.01); *H04L 45/24* (2013.01); *H04L 67/42* (2013.01)

(58) Field of Classification Search
CPC . H04L 67/42; H04L 67/2876; H04L 67/2842; H04L 29/08792; H04L 43/04;
(Continued)

(56) References Cited

U.S. PATENT DOCUMENTS

2005/0099983 A1* 5/2005 Nakamura .............. H04L 45/20
370/338
2010/0318665 A1* 12/2010 Demmer ................. H04L 41/12
709/227
(Continued)

FOREIGN PATENT DOCUMENTS

| EP | 2538637 A2 | 12/2012 |
| WO | 2011041798 A1 | 4/2011 |
| WO | 2012049631 A1 | 4/2012 |

OTHER PUBLICATIONS

Extended European Search Report for corresponding European Application No. 13196340.7, dated Apr. 16, 2014.
(Continued)

*Primary Examiner* — Zarni Maung
(74) *Attorney, Agent, or Firm* — Workman Nydegger (57) ABSTRACT

A data transfer connection between a device and another device can be established using a basic protocol having a multipath extension that allows for the data transfer connection to use several different paths in parallel. In establishing the data transfer connection, an intermediate device receives a connection request from the device. This connection request comprises an indication that the device is capable of handling the multipath extension. In addition, the connection request comprises an identification of the other device with which the data transfer connection is to be established. The intermediate device then determines whether the other device is capable of handling the multipath extension, or not. The intermediate device establishes the data transfer connection in accordance with the multi- (Continued)

path extension if the other device is capable of handling the multipath extension. Otherwise, the intermediate device establishes the data transfer connection as a concatenation of data transfer connection portions.

17 Claims, 5 Drawing Sheets

(51) Int. Cl.
*H04L 12/707* (2013.01)
*G06F 12/00* (2006.01)

(58) Field of Classification Search
CPC ....... H04L 43/12; H04L 67/108; H04L 67/18; H04L 67/22; H04L 69/326; H04L 41/12; H04L 61/103; H04L 61/2514; H04L 69/329; H04L 69/40; H04L 41/0663; H04L 49/00
See application file for complete search history.

(56) References Cited

U.S. PATENT DOCUMENTS

| | | | |
|---|---|---|---|
| 2012/0226802 A1 | 9/2012 | Wu et al. | |
| 2012/0331160 A1* | 12/2012 | Tremblay | H04L 69/14 709/228 |
| 2013/0117621 A1* | 5/2013 | Saraiya | H04L 49/356 714/748 |
| 2013/0304902 A1* | 11/2013 | Demmer | H04W 4/02 709/224 |
| 2013/0339549 A1* | 12/2013 | Rangaraman | H04L 61/103 709/245 |
| 2014/0304291 A9* | 10/2014 | Tan | G06F 17/30247 707/769 |

OTHER PUBLICATIONS

International Search Report for corresponding International PCT Application No. PCT/EP2014/076942, dated Apr. 2, 2015.

* cited by examiner

ESTABLISHING A DATA TRANSFER CONNECTION

FIELD OF THE INVENTION

An aspect of the invention relates to a method of establishing a data transfer connection between a device and another device using a basic protocol having an extension that allows for an enhanced data transfer. The data transfer connection may be established through a communication network, such as, for example, the Internet. The basic communication protocol may be, for example, a protocol known as Transmission Control Protocol, commonly designated by the acronym TCP. The extension may be, for example, a multipath extension of TCP, commonly designated by the acronym MPTCP. Other aspects of the invention relate to a computer program, and a processor.

BACKGROUND OF THE INVENTION

A data transfer over the Internet typically involves the use of TCP. TCP allows a packet-wise transfer of data from a source entity to a destination entity in a reliable and ordered fashion. The source entity and the destination entity are at least partially identified by means of their respective IP addresses. IP is an acronym for Internet Protocol.

Originally, TCP allowed for a data transfer from a single IP address only to another single IP address only. This implied that a data transfer connection according to TCP could comprise a single path only. In a data transfer, the source entity could send data via a single physical communication link only. Likewise, the destination entity could receive the data via a single physical communication link only. This constitutes a restriction in case at least one of these entities is connected to a communication network, such as the Internet, via various different physical communication links. In that case, multiple paths are available for transferring data.

An extension of TCP enables data transfer from a source entity to a destination entity via multiple paths in parallel. This multipath extension is commonly referred to as multipath TCP, commonly designated by the acronym MPTCP, and defined in document RFC6824, which is incorporated by reference herein. In effect, MPTCP can split up a data transfer flow into two parallel data transfer sub-flows. Each of these two sub-flows can be transported in a fashion according to the TCP protocol as if it were a complete data transfer. One sub-flow can be routed over a communication path; the other sub-flow can be routed over another communication path. This path diversity can be achieved by specifying different IP addresses as the source entity, or the destination entity, or both, in the one and the other sub-flow.

However, such a multipath data transfer requires that both the source entity and the destination entity can handle MPTCP. That is, the source entity and the destination entity should both be MPTCP capable. In case only one of the aforementioned entities is MPTCP capable, whereas the other is not, the data transfer takes place via a single path only, in a conventional fashion according to the TCP protocol. That is, each of the two entities involved in the data transfer can use only a single physical communication link to receive data, or to send data, or both. There will be no multipath benefits such as, for example, increased resilience and increased throughput through parallel use of various different physical communication links.

Patent publication WO 2012/049631 describes an edge router that is coupled to a subscriber end station that has not been updated to MPTCP. The edge router enables communications with the subscriber end station to fully utilize MPTCP. This is done by running an MPTCP proxy on the edge router that is coupled to the subscriber end station. As a result, the subscriber end station is unaware of any MPTCP utilization and runs TCP as normal. The edge router performs the necessary conversions between TCP and MPTCP so that packets sent from the subscriber end station over a TCP connection are demultiplexed to a MPTCP connection. Likewise, packets sent to the subscriber end station over an MPTCP connection are multiplexed by the edge router to a TCP connection.

Patent publication EP 2 538 637 describes a method of providing multipath proxy services. A proxy server receives a TCP/IP connection request from a client device, which specifies that the client device is capable of establishing a multipath TCP/IP connection. In response, a single path TCP/IP connection is established from the proxy server to a serving node, while a multipath TCP/IP connection is established between the proxy server and the client device. The proxy server proxies communications between the client device and the serving node over these respective connections.

SUMMARY OF THE INVENTION

There is a need for a solution that allows a device to effectively use an extension of a protocol in a data transfer with another device, even if the other device is not capable of handling the extension of the protocol.

In order to better address this need, in accordance with an aspect of the invention, there is provided a method of establishing a data transfer connection as defined in claim 1. Another aspect of the invention concerns a computer program comprising a set of instructions that enables a processor, which is capable of executing the set of instructions, to carry out this method. Yet another aspect of the invention concerns a processor adapted to carry out this method.

In each of these aspects, a device that is capable of handling the multipath extension can systematically use this extension, at least in a portion of a data transfer connection that extends between this device and an intermediate device. The device can thus systematically benefit from path diversity even if another device, with which the data transfer connection is established through the intermediate device, is not capable of handling the multipath extension.

The aspects presented hereinbefore may further contribute to resolving a deployment problem of an extension of a data transfer protocol. Namely, in case a device can use an extension only in data transfers with devices that can also handle the extension, there may be little interest in having such an extension-capable device. This may be particularly true if there are relatively few extension-capable devices. This can be regarded as a "chicken and egg" situation. In the aspects presented hereinbefore, an extension-capable device can effectively use this extension in a data transfer with another device even if the other device is not capable extension-capable. This may thus provide a solution to the deployment problem as described.

It should be noted that the method as defined in claim 1 fundamentally differs from using an edge router as described in the aforementioned patent publication. The edge router is associated with a particular subscriber end station so as to allow this subscriber end station to benefit from MPTCP. However, it is necessary that another subscriber end station, with which the data is to be transferred, satisfies at least one of the following two conditions. The other subscriber end station should be capable of handling MPTCP. If not, an edge router should also be associated with the other subscriber end station. That is, a MPTCP data transfer is possible only if each subscriber end station that is not MPTCP capable is associated with an edge router as described in the aforementioned patent application. There is thus a potential deployment problem similar to that described hereinbefore with regard to edge routers.

In accordance with another aspect of the invention, there is provided a method of generating a connection request as defined in claim 10. Another aspect of the invention concerns a computer program comprising a set of instructions that enables a processor, which is capable of executing the set of instructions, to carry out this method. Yet another aspect of the invention concerns a processor adapted to carry out this method.

These other aspects of the invention allow explicitly including an intermediate device in a data transfer connection between two devices. The intermediate device can be, for example, a specifically designated device among a pool of devices that are interconnected with each other, as well as with the two aforementioned devices, through a communication network. The data transfer connection can be made to explicitly pass through the intermediate device, at least initially. The intermediate device may contribute to the data transfer connection being, for example, more reliable or faster, or both. Another advantage of the intermediate device being explicitly present in the data transfer connection is that this can contribute to identifying and resolving a problem in the data transfer connection.

An embodiment of the invention may optionally comprise one or more additional features as defined in the dependent claims. These additional features may each contribute to at least one of the advantages mentioned hereinbefore, and may provide further advantages.

For the purpose of illustration, a detailed description of some embodiments of the invention is presented with reference to accompanying drawings.

DETAILED DESCRIPTION

Figure 1:
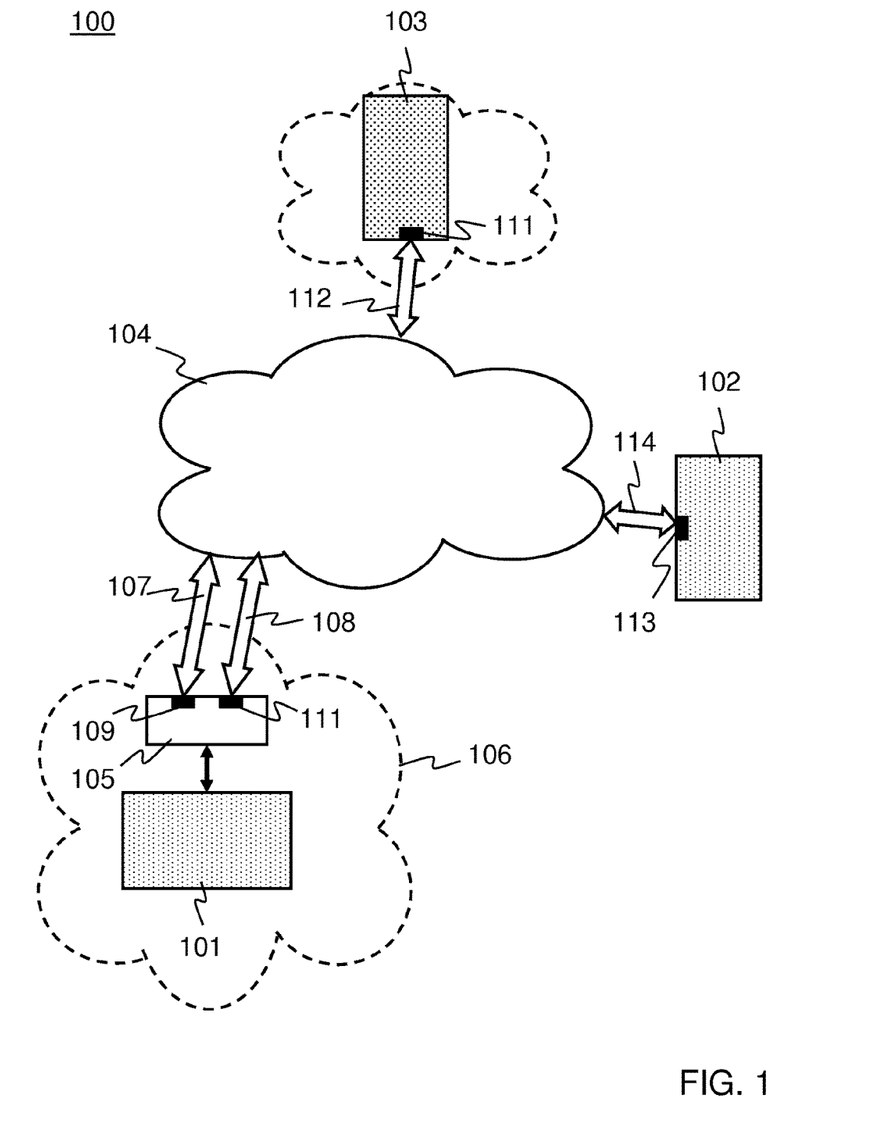
FIG. 1 is a conceptual diagram that illustrates a communication infrastructure.

FIG. 1 schematically illustrates a communication infrastructure 100, which comprises various communication devices 101, 102, 103 that are coupled to a communication network 104. The communication network 104 may comprise, for example, the Internet. The communication network 104 will hereinafter be referred to as the Internet 104 for reasons of convenience. A communication device 101 can obtain services from another communication device 102 through the Internet 104. The communication device 101, which can obtain services, will be referred to as client device 101 hereinafter. The other communication device 102, which can provide services, will be referred to as server device 102 hereinafter. The server device 102 illustrated in FIG. 1 may be any communication device among numerous communication devices capable of providing services through the Internet 104.

The communication infrastructure 100 comprises a communication device 103 that can serve as an intermediate between the client device 101 and the server device 102. This communication device 103 will therefore be referred to as intermediate device 103 hereinafter. The intermediate device 103 may be one among a pool of communication devices capable of providing services to the Internet 104. That is, the intermediate device 103 may form part of a "cloud" of such devices in the communication infrastructure 100. This can be expressed as the intermediate device 103 being in the "cloud".

FIG. 1 presents an example in which the client device 101 is coupled to the Internet 104 via a router 105. The client device 101 and the router 105 may form part of a local network 106, which may belong to, for example, an enterprise or a household. The local network 106 may comprise other client devices, which may also be coupled to the Internet 104 via the router 105.

There are various different physical communication links 107, 108 that couple the router 105 to the Internet 104. For example, a first physical communication link 107 that couples the router 105 to the Internet 104 may form part of, for example, a landline telephone network. A second physical communication link 108 may form part of, for example, a cellular telephone network. There may be further physical communication links, which have not been represented for reason of simplicity and ease of explanation. For each different physical communication link, a dedicated communication interface can be arranged between the router 105 and the network concerned, which provides the communication link.

The router 105 has various different IP addresses 109, 110, IP being an acronym of Internet 104 Protocol. A first IP address 109 is associated with the first physical communication link 107. A second IP address 110 is associated with a second physical communication link 108. Consequently, a data transfer that specifies the first IP address 109 will pass through the first physical communication link 107. Likewise, a data transfer that specifies the second IP address 110 will pass through the second physical communication link 108. The router 105 may have further IP addresses if there are further physical communication links.

The intermediate device 103 may have a single IP address 111 as illustrated in FIG. 1. The intermediate device 103 may be connected to the Internet 104 via a single physical communication link 112. Likewise, the server device 102 may have a single IP address 113. The server device 102 may be connected to the Internet 104 via a single physical communication link 114. This presentation in FIG. 1 has been made for reasons of simplicity and ease of explanation. The intermediate device 103 may have various different IP addresses, as well as various different physical communication links that provide connections to the Internet 104. The same applies to the server device 102.

A data transfer over the Internet 104 typically involves the use of a protocol known as Transmission Control Protocol, commonly designated by the acronym TCP. TCP allows a packet-wise transfer of data from a source entity to a destination entity in a reliable and ordered fashion. The source entity and the destination entity are at least partially identified by means of their respective IP addresses.

Originally, TCP allowed for a data transfer from a single IP address only to another single IP address only. This implied that a data transfer connection according to TCP could comprise a single path only. In a data transfer, the source entity could send data via a single physical communication link only. Likewise, the destination entity could receive the data via a single physical communication link only. This constitutes a restriction in case at least one of these entities is connected to a communication network, such as the Internet, via various different physical communication links. In that case, multiple paths are available for transferring data.

An extension of TCP enables data transfer from a source entity to a destination entity via multiple paths in parallel. This multipath extension is commonly referred to as multipath TCP, commonly designated by the acronym MPTCP, and defined in document RFC6824, which is incorporated by reference herein. In effect, MPTCP can split up a data transfer flow into two parallel data transfer sub-flows. Each of these two sub-flows can be transported in a fashion according to the TCP protocol as if it were a complete data transfer. One sub-flow can be routed over a communication path; the other sub-flow can be routed over another communication path. This path diversity can be achieved by specifying different IP addresses as the source entity, or the destination entity, or both, in the one and the other sub-flow.

However, such a multipath data transfer requires that both the source entity and the destination entity can handle MPTCP. That is, the source entity and the destination entity should both be MPTCP capable. In case only one of the aforementioned entities is MPTCP capable, whereas the other is not, the data transfer takes place via a single path only, in a conventional fashion according to the TCP protocol. That is, each of the two entities involved in the data transfer can use only a single physical communication link to receive data, or to send data, or both. There will be no multipath benefits such as, for example, increased resilience and increased throughput through parallel use of various different physical communication links.

Referring to FIG. 1, the router 105 is MPTCP capable. The client device 101 need not be MPTCP capable. In fact, the router 105 may be assumed to have been inserted between the client device 101 and the Internet 104 so as to allow the client device 101 to benefit from the various different physical communication links 107, 108 with the Internet 104.

However, the server device 102 need not be MPTCP capable; the server device 102 may be able to communicate in accordance with a basic version of TCP only, allowing for a single communication path only. In case the client device 101 establishes a data transfer connection with the server device 102 in a conventional fashion, the client device 101 will not benefit from the various different physical communication links 107, 108 that the router 105 provides for access to the Internet 104.

There is thus a potential deployment problem for MPTCP. There is relatively little interest in having an MPTCP capable communication device if there are relatively few other communication devices of interest that are MPTCP capable. In such a case, there is no strong incentive for upgrading an existing communication device to become MPTCP capable. Neither is there a strong incentive to develop new communication devices that are MPTCP capable. This is a "chicken and egg" situation, which may result in a relatively slow deployment of MPTCP.

The intermediate device 103 can provide a solution. The intermediate device 103 is MPTCP capable. The intermediate device 103 can operate as an MPTCP/TCP converter in data transfers between the router 105 and the server device 102. In effect, such a data transfer is organized as a concatenation of two data transfer portions: a data transfer portion according to the MPTCP protocol between the router 105 and the intermediate device 103, and another data transfer portion according to the TCP protocol between the intermediate device 103 and the server device 102.

In this scheme, the client device 101 can at least benefit from the various different physical communication links 107, 108 that the router 105 provides for access to the Internet 104. If one of these links fails, the data transfer can continue on another link. An established connection is not lost; the connection is more resilient. Moreover, the data transfer can be carried out at a higher rate through the parallel use of the two communication links. An established connection can be faster, provide higher throughput.

Figure 2:
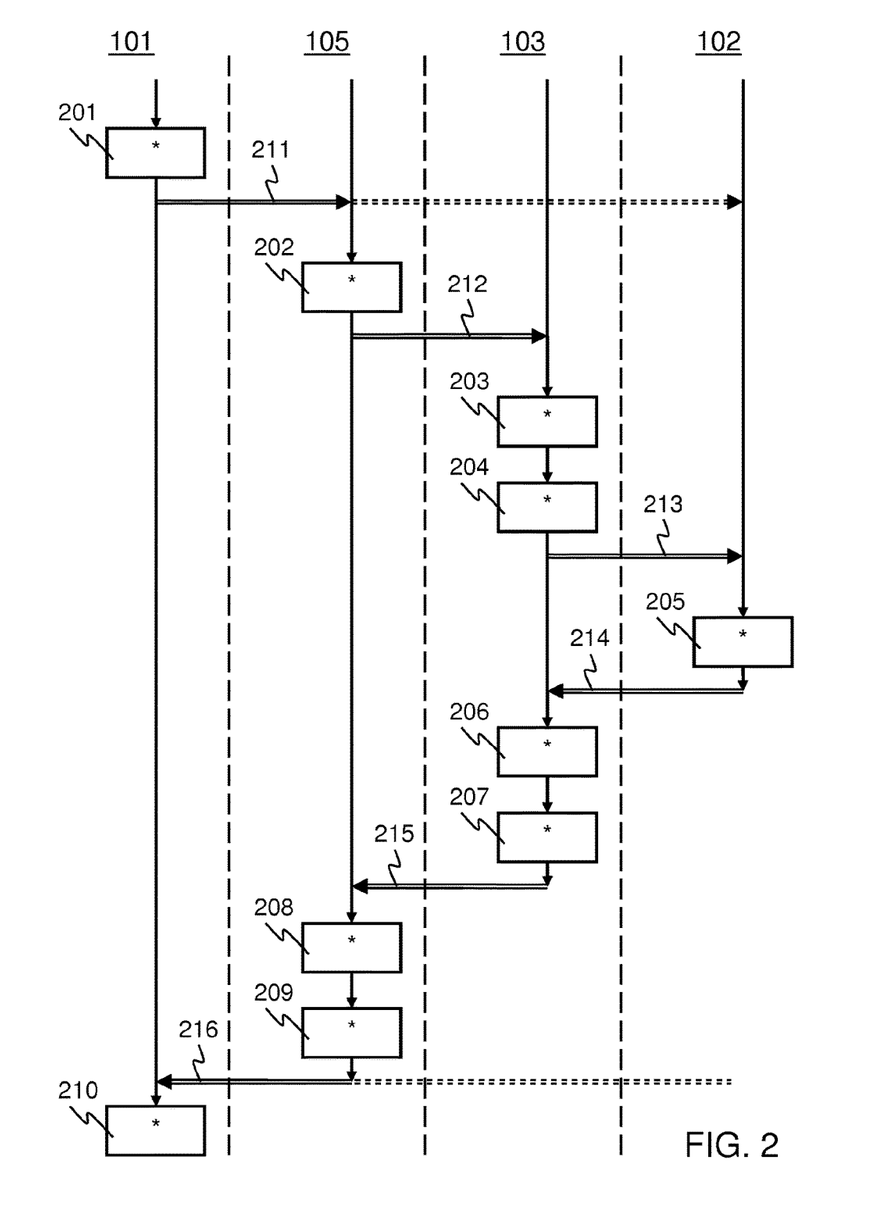
FIG. 2 is a flow chart diagram that illustrates a method of establishing a data transfer connection in the communication infrastructure.

FIG. 2 schematically illustrates a method of establishing a data transfer connection between the client device 101 and the server device 102 in the communication infrastructure 100 illustrated in FIG. 1. The method provides an exemplary explanation on how a data transfer connection between an MPTCP capable device and a non-MPTCP capable device can be organized as comprising a concatenation of the following two data transfer connection portions. Firstly, an MPTCP data transfer connection portion between the MPTCP capable device and the intermediate device 103. Secondly, a TCP data transfer connection portion between the intermediate device 103 and the non-MPTCP capable device.

The method comprises a series of steps 201-210, which involve the client device 101, the router 105, the intermediate device 103 and the server device 102. FIG. 2 is therefore vertically divided into several columns. An extreme left column illustrates various steps that the client device 101 carries out. A middle left column illustrates various steps that the router 105 carries out. A middle right column illustrates various steps that intermediate device 103 carries out. An extreme right column illustrates various steps that the server device 102 carries out.

The extreme left column of FIG. 2 can be regarded as a flowchart representation of a computer program, that is, a set of instructions, which enable the client device 101 to carry out various operations described hereinafter with reference to FIG. 2. Likewise, the middle left column, the middle right column, and the extreme right column of FIG. 2 can be regarded as respective flowchart representations of respective computer programs, which enable the router 105, the intermediate device 103, and the server device 102, respectively, to carry out various operations described hereinafter with reference to FIG. 2. Regarding the intermediate device 103, the set of instructions may advantageously be in the form of a kernel module in an operating system that runs on the intermediate device 103.

In a connection request issuance step 201, the client device 101 issues a connection request 211 that is directed to the server device 102. The connection request 211 comprises a TCP segment having a so-called SYN flag that is set, as specified in TCP. Such a TCP segment will be referred to as SYN segment hereinafter. The SYN segment has a header that identifies a source port and a destination port, as well as other types of information as specified in TCP. The SYN segment may be encapsulated in a packet that specifies the IP address of the client device 101 in a source address field, and the IP address 113 of the server device 102 in a destination address field. Such a packet may be, for example, an IP packet or a UDP packet, UDP being an acronym for User Datagram Protocol.

In a connection request substitution step 202, the router 105 intercepts the connection request 211 that the client device 101 has issued. The router 105 then carries out a series of operations, which will be described hereinafter. The router 105 may equally carry out this series of operations upon interception of any other connection request Instead of routing the connection request 211 to the IP address that is specified in the destination address field, which is the server device 102 in this example, the router 105 replaces the connection request by an indirect connection request 212 that is directed to the intermediate device 103. The indirect connection request is similar in format to the connection request 211. That is, the connection request also comprises a SYN segment encapsulated in an IP packet, which has a destination address field and a source address field.

In order to direct the indirect connection request 212 to the intermediate device 103, the router 105 places the IP address 111 of the intermediate device 103 in the destination address field of this message. In effect, the router 105 may systematically overwrite the IP address in the destination address field of an intercepted connection request, which is the IP address 113 of the server device 102 in this example, by the IP address 111 of the intermediate device 103. The router 105 places one of its two IP addresses in the source address field of the indirect connection request 212. In this example, it is assumed that the router 105 places its first IP address 109 in the source address field of the indirect connection request 212.

The router 105 places the IP address that is specified in the destination address field of the connection request in a specific field of the indirect connection request 212. This specific field is a field other than the destination address field. The router 105 may also place in this specific field the destination port identified in the header of the SYN segment in the connection request that the router 105 has intercepted. Thus, in this example, the specific field in the indirect connection request 212 comprises the IP address 113 of the server device 102 together with the destination port.

The specific field is known by the intermediate device 103 to comprise an indication of a target entity with which the IP address specified in the source address field seeks to establish a data transfer connection. The specific field that comprises the indication of the target entity can be in located the SYN segment of the indirect connection request 212. More specifically, the aforementioned field can be located in a header of the SYN segment or a payload section of the SYN segment. This will be described in greater detail hereinafter.

The router 105 includes a so-called MP_CAPABLE option in the SYN segment of the indirect connection request 212. This option is a string of bits in the SYN segments that indicates that the IP address specified in the source address field is capable of handling MPTCP.

The router 105 may create a session that is dedicated to carrying out a relay role in a data transfer connection that is to be established between the following two entities. Firstly, an entity having the IP address that is specified in the source address field of the connection request that the router 105 has intercepted. Secondly, the intermediate device 103 to which the indirect connection request 212 is directed. Accordingly, the session that the intermediate device 103 creates in this example, concerns the data transfer connection between the client device 101 and the intermediate device 103. Since both these two entities are MPTCP capable, this data transfer connection can use multiple paths in parallel: a path via the first physical communication link 107, as well as another path via the second physical communication link 108 illustrated in FIG. 1.

In an indirect connection request processing step 203, the intermediate device 103 receives the indirect connection request 212 that the router 105 has issued. The intermediate device 103 then carries out a series of operations, which will be described hereinafter. The intermediate device 103 may carry out this series of operations upon reception of any other indirect connection request 212. Such another indirect connection request 212 may have been issued by an entity in the communication infrastructure 100 illustrated in FIG. 1 other than the router 105.

The intermediate device 103 recognizes that the indirect connection request 212 comprises the specific field that indicates the target entity with which the data transfer connection has to be established. The intermediate device 103 retrieves the IP address from this specific field, which is the IP address 113 of the server device 102 in this example, as well as the destination port. The intermediate device 103 further recognizes the MP_CAPABLE option in the SYN segment of this message.

The intermediate device 103 may create a session that is dedicated to carrying out an intermediate role in establishing a data transfer connection between the following entities. Firstly, an entity having the IP address that is specified in the source address field of the indirect connection request 212. Secondly, an entity having the IP address that is specified in the specific field that indicates the target entity. Accordingly, the session that the intermediate device 103 creates in this example, concerns the data transfer connection between the router 105 and the server device 102.

Having recognized the MP_CAPABLE option, the intermediate device 103 seeks to determine whether the target entity, which is the server device 102 in this example, is MPTCP capable, or not. The intermediate device 103 may do so by carrying out the following steps.

In a delegated connection request step 204, the intermediate device 103 issues a delegated connection request 213 that is directed to the target entity, which is the server device 102 in this example. The delegated connection request 213 is similar in format to the connection request that the client device 101 has issued. That is, the connection request also comprises a SYN segment, as defined in TCP, encapsulated in an IP packet, which has a destination address field and a source address field. In fact, the adjective "delegated" is merely used to distinguish this connection request, which the intermediate device 103 directs to the target entity, from the connection request that the client device 101 has originally directed to the server device 102.

The intermediate device 103 includes the MP_CAPABLE option in the SYN segment of the delegated connection request 213. The intermediate device 103 places its IP address in the source address field and the IP address of the server device 102 in the destination address field. The intermediate device 103 associates the delegated connection request 213 with the aforementioned session that has been created.

In an initial acknowledgment step 205, the server device 102 receives the delegated connection request 213 that the intermediate device 103 has issued. The server device 102 processes this connection request like any other ordinary connection request that comprises a SYN segment. In fact, at least at this stage, the server device 102 has no knowledge, as it were, that the intermediate device 103 has issued the delegated connection request 213 in response to the substituting connection request that the router 105 has issued upon interception of the connection request from the client device 101. That is, at this stage, the server device 102 ignores this whole request chain. The server device 102 processes the delegated connection request 213 as an ordinary connection request in accordance with TCP. This implies that the server device 102 may recognize the MP_CAPABLE option in the SYN segment of the delegated connection request 213.

In the initial acknowledgment step 205, the server device 102 issues an initial acknowledgment 214 that is directed to the intermediate device 103. The initial acknowledgment 214 comprises a TCP segment having a so-called ACK flag that is set and a sequence number field with an appropriate value, which is derived from the SYN segment received, all as specified in TCP. Such a TCP segment will be referred to as TCP/ACK segment hereinafter. The SYN/ACK segment is encapsulated in an IP packet that specifies the IP address 113 of the server device 102 in a source address field, and the IP address 111 of the intermediate device 103 in a destination address field. The server device 102 thus responds to the delegate connection request in a fashion similar to any other ordinary connection request in accordance with TCP.

In case the server device 102 is MPTCP capable, the server device 102 includes the MP_CAPABLE option in the SYN/ACK segment of the initial acknowledgment 214. Conversely, in case the server device 102 is not MPTCP capable, the MP_CAPABLE option will not be present in the SYN/ACK segment of the initial acknowledgment 214. Accordingly, the server device 102 signals in the initial acknowledgment 214 whether the server device 102 is MPTCP capable, or not. In this example, the server device 102 is not MPTCP capable so that the SYN/ACK segment does not comprise the MP_CAPABLE option.

In an initial acknowledgment analysis step 206, the intermediate device 103 receives the initial acknowledgment 214 that the server device 102 has issued. The intermediate device 103 associates the initial acknowledgment 214 with the session that the intermediate device 103 has created for its intermediate role in the data transfer connection between the router 105 and the server device 102. The intermediate device 103 determines whether the MP_CAPABLE option is present in the SYN/ACK segment, or not. Accordingly, the intermediate device 103 determines whether the server device 102 is capable of handling MPTCP, or not. This will affect the intermediate role that the intermediate device 103 carries out in establishing the data transfer connection between the client device 101 and the server device 102, as will be explained in greater detail hereinafter.

In a first subsequent acknowledgment step 207, the intermediate device 103 issues a first subsequent acknowledgment 215 that is directed to the router 105. This first subsequent acknowledgment 215 is similar in format to the initial acknowledgment 214 that the server device 102 has issued. The first subsequent acknowledgment 215 equally comprises a SYN/ACK segment is encapsulated in an IP packet. Here, the IP packet specifies the IP address 111 of the intermediate device 103 in the source address field. The intermediate device 103 places in the destination address field the IP address that was specified in the source address field of the indirect connection request 212 that is associated with the session concerned. In this example, this IP address is the first IP address 109 of the router 105. Moreover, the SYN/ACK segment of the first subsequent acknowledgment comprises the MP_CAPABLE option. The intermediate device 103 thus informs the router 105 that it is also capable of handling MPTCP.

In a first subsequent acknowledgment analysis step 208, the router 105 receives the first subsequent acknowledgment 215 that the intermediate device 103 has issued. The router 105 associates the first subsequent acknowledgment 215 with the session that the router 105 has created for its relaying role in the data transfer connection between the client device 101 the intermediate device 103. The intermediate device 103 detects that the MP_CAPABLE option is present in the SYN/ACK segment. Accordingly, the data transfer connection between the router 105 and the intermediate device 103 can use multiple paths. That is, this data transfer connection is multipath enabled: it may also use the second physical communication link 108, which connects the router 105 to the Internet 104, in parallel with the first physical communication link 107, which is involved in establishing the data transfer connection as described with reference to FIG. 2.

In a second subsequent acknowledgment step 209, the router 105 issues a second subsequent acknowledgment 216 that is directed to the client device 101. This second subsequent acknowledgment 216 is similar in format to the initial acknowledgment 214 and the first subsequent acknowledgment 215. The second subsequent acknowledgment 216 equally comprises a SYN/ACK segment encapsulated in a packet. The router 105 places the IP address 113 of the server device 102 in the source address field, instead of placing its own IP address in the source address field. The IP address of the client device 101 is specified in the destination address field. The MP_CAPABLE option is not present in the second subsequent acknowledgment 216. This is because this option was not present in the connection request that the client device 101 has issued, which was intercepted by the router 105.

In a second subsequent acknowledgment reception step 210, the client device 101 receives the second subsequent acknowledgment 216 that the router 105 has issued. The client device 101 regards this acknowledgment as an acknowledgment that has been issued by the server device 102 in response to the connection request that the client device 101 has issued. This is because the IP address 113 of the server device 102 is specified in the source address field of this acknowledgment. In a manner of speaking, the client device 101 is unaware that the data transfer connection that has been established with the server device 102, involves the router 105 and the intermediate device 103. That is, like the server device 102, at least at this stage, the client device 101 ignores, as it were, this chain of devices in the data transfer connection with the server device 102. The router 105 and the intermediate device 103 are transparent and from a point of view of the client device 101.

Figure 3:
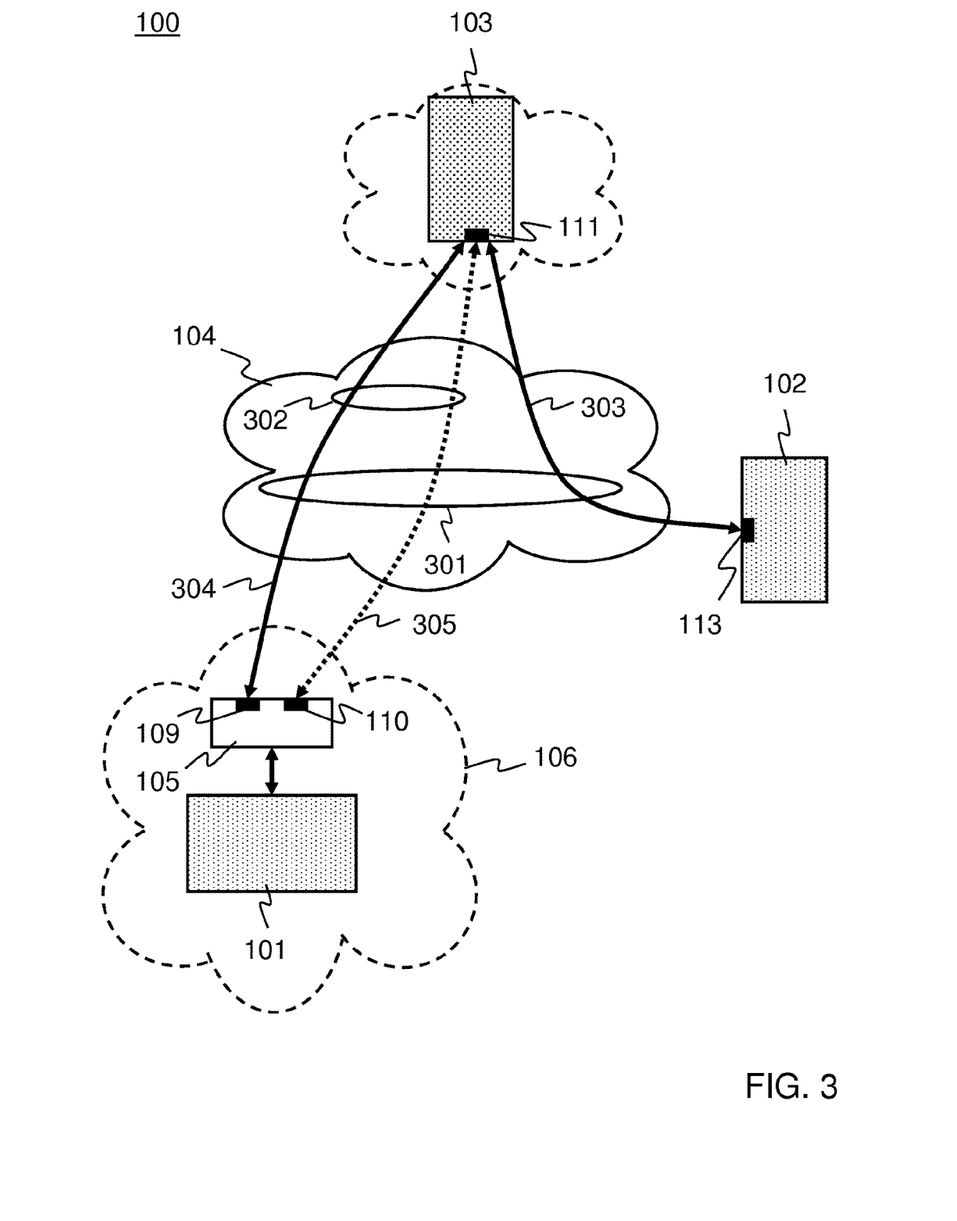
FIG. 3 is a conceptual diagram that illustrates the data transfer connection that has been established in the communication infrastructure.

FIG. 3 illustrates the data transfer connection 301 between the client device 101 and the server device 102 that has been established as described hereinbefore. In this example, it was assumed that the server device 102 is not MPTCP capable, which has been detected by the intermediate device 103. The intermediate device 103 thus organizes the data transfer connection between the client device 101 and the server device 102 so that this connection comprises a concatenation of two data transfer connection portions. Firstly, a multipath-enabled data transfer connection portion 302 between the router 105 and the intermediate device 103 in accordance with MPTCP. Secondly, a single-path data transfer connection portion 303 between the intermediate device 103 and the server device 102 in accordance with a conventional version of TCP, without the multipath extension.

FIG. 3 illustrates that the multipath-enabled data transfer connection portion 302 between the router 105 and the intermediate device 103 starts with an initial path 304 between the first IP address 109 of the router 105 and the IP address 111 of the intermediate device 103. This is because the router 105 has specified its first IP address 109 in the indirect connection request 212, which was directed to the intermediate device 103. The initial path 304 thus comprises the first physical communication link 107 illustrated in FIG. 1. This is because this communication link 107 connects the router 105, via its first IP address 109, to the Internet 104.

Since the router 105 and the intermediate device 103 are both MPTCP capable, an additional path 305 can be added to the multipath-enabled data transfer connection portion. This additional path 305 extends between the second IP address 110 of the router 105 and the IP address 111 of the intermediate device 103. The additional path thus comprises the second physical communication link 108 illustrated in FIG. 1. This is because this communication link 108 connects the router 105, via its second IP address 110, to the Internet 104.

MPTCP specifies a mechanism for adding a path to a data transfer connection that has been established, as described hereinbefore. In effect, a path is added in a fashion that is similar to establishing a data transfer connection as originally specified in TCP. Basically, adding a path between two MPTCP capable devices involves one device sending a SYN segment, and the other device sending back a SYN/ACK segment, whereby these segments include a so-called MP_JOIN option. The latter option indicates that the data transfer connection that is thus established should be added to an already established multipath-enabled data transfer connection.

More specifically, in the example illustrated in FIG. 3, the additional path 305 can be added to the multipath-enabled data transfer connection portion in the following manner. The router 105 issues a path addition request that is directed to the intermediate device 103. The path addition request is similar in format to the connection request described hereinbefore, which the client device 101 has originally issued. That is, the path addition request also comprises a SYN segment encapsulated in an IP packet, which has a source address field and a destination address field.

A specific feature of the path addition request is that the SYN segment includes the MP_JOIN option mentioned hereinbefore. This option comprises information that allows the additional path 305 to be associated with the multipath-enabled data transfer connection portion that has been established. Consequently, the MP_JOIN option allows the additional path 305 to be associated with the initial path 304 of this connection portion. The IP packet specifies its second IP address 110 in the source address field and the IP address 111 of the intermediate device 103 in the destination address field. In this example, the second IP address 110 distinguishes the additional path 305 from the initial path 304, which has been first IP address 109 of the router 105 as a terminating point.

Upon reception of the path addition request, the intermediate device 103 issues a path addition acknowledgment that is directed back to the router 105. The path addition acknowledgment is similar in format to the acknowledgments described hereinbefore, which were issued in establishing the data transfer connection as illustrated in FIG. 2. That is, the path addition acknowledgment also comprises a SYN/ACK segment encapsulated in an IP packet, which has a source address field and a destination address field. The SYN segment also includes the MP_JOIN option mentioned hereinbefore.

The intermediate device 103 carries out TCP/MPTCP conversions in the data transfer connection between the client device 101 and the server device 102 illustrated in FIG. 3. To that end, the intermediate device 103 may, in effect, provide a MPTCP communication port and TCP communication port. The MPTCP communication port is provided for the multipath-enabled data transfer connection portion with the router 105. The TCP communication port is provided for the single-path data transfer connection portion with the server device 102.

In a data transfer from the client device 101 to the server device 102, MPTCP segments that carry data as payload arrive at the MPTCP communication port of the intermediate device 103. An MPTCP segment may arrive via the initial path 304 or the additional path 305, if this path has been included in the multipath-enabled data transfer connection portion. This is because, in effect, the router 105 can split up a flow of TCP segments from the client device 101 into two sub-flows of MPTCP segments directed to the intermediate device 103. One sub flow may follow the initial path 304; the other sub flow may follow the additional path 305. In effect, the intermediate device 103 merges these two sub flows of MPTCP segments through the MPTCP communication port.

The intermediate device 103 retrieves the data that is carried as payload from the MPTCP segments that have arrived at the MPTCP communication port. The intermediate device 103 then places this data in TCP segments that are directed to the server device 102 through the TCP communication port. This data forwarding may involve a reordering of segments. This is because MPTCP segments that are carried in one sub flow arrive independently from MPTCP segments that are carried in the other sub flow.

The data forwarding from the MPTCP communication port to the TCP communication port may involve further operations that concern headers. The intermediate device 103 may transpose information comprised in the header of a received MPTCP segment, which carries the data as payload, to the header of a TCP segment in which this data is placed. This transposition may involve, for example, deletion of an option that is MPTCP specific. This transposition may also involve a sequence number translation: the MPTCP segments may use a sequence numbering that differs from that used for the TCP segments. Furthermore, the received MPTCP segment has a checksum. This checksum may no longer be valid if header information is modified. The intermediate device 103 may then calculate a new checksum for the TCP segment.

Conversely, in a data transfer from the server device 102 to the client device 101, TCP segments that carry data as payload arrive at the TCP communication port of the intermediate device 103. The intermediate device 103 retrieves the data that is carried as payload from these PTCP segments. The intermediate device 103 then places this data in MPTCP segments that are directed to the router 105 through the MPTCP communication port. This data forwarding may involve a distribution among two sub flows: a sub flow that follows the initial path 304 and another sub flow that follows the additional path 305 to the router 105. This distribution can be based on a scheduling algorithm.

Figure 4:
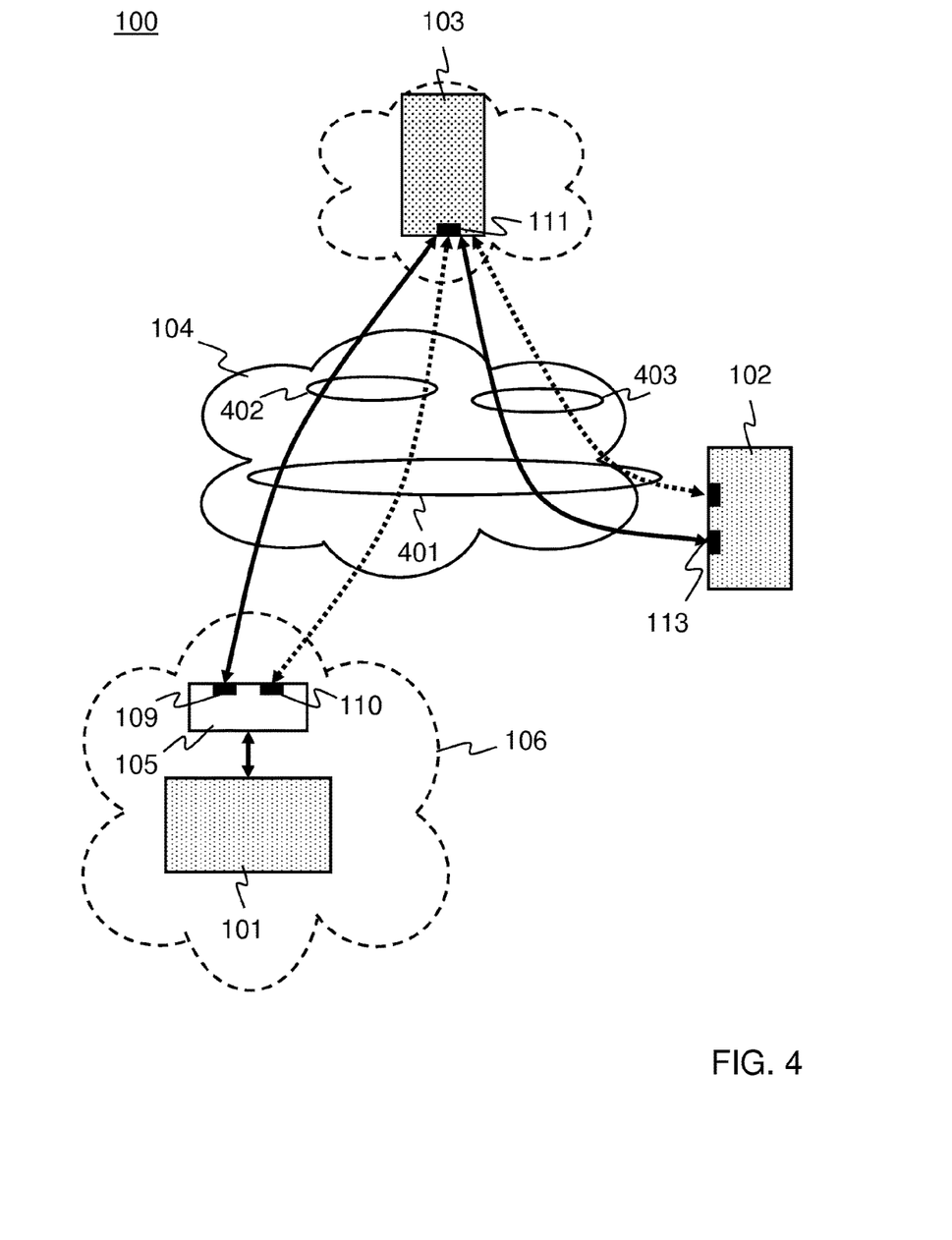
FIG. 4 is a conceptual diagram that illustrates another data transfer connection that can be established in the communication infrastructure.

FIG. 4 illustrates another data transfer connection 401 between the client device 101 and the server device 102 that may be established if the server device 102 is MPTCP capable. This is in contrast with the example described hereinbefore, in which it was assumed that the server device 102 is not MPTCP capable. The data transfer connection illustrated in FIG. 4 comprises a concatenation of two multipath enabled data transfer connection portions 402, 403: one 402 between the router 105 and the intermediate device 103, and another such connection portion 403 between the intermediate device 103 and the server device 102. In such a situation, there is no need for an intermediate between the router 105 and the server device 102. The router 105 can establish a direct, multipath-enabled data transfer connection with the server device 102 in accordance with MPTCP.

In the situation illustrated in FIG. 4, the intermediate device 103 may withdraw itself from the data transfer connection between the client device 101 and the server device 102. This withdrawal may even be advantageous. Namely, in the situation illustrated in FIG. 4, MPTCP segments that are transferred from the router 105 to the server device 102, and vice versa, pass via the intermediate device 103. This can introduce delay and may present other drawbacks. In order to withdraw itself, the intermediate device 103 may use mechanisms offered by MPTCP.

For example, the intermediate device 103 may issue a TCP segment with a so-called ADD-ADDR option. This TCP segment is directed to the router 105. The ADD-ADDR option specifies a new IP address for the multipath enabled data transfer connection portion between the router 105 and the intermediate device 103. However, an IP address 113 of the server device 102 is presented as this new IP address. Upon reception of the aforementioned TCP segment, the router 105 establishes a new data path connection with the new IP address specified in the ADD-ADDR option. The router 105 establishes this new connection as if it were an additional path to be added to the multipath enabled data transfer connection portion between the router 105 and the intermediate device 103. This process is similar to that described in hereinbefore using the MP_JOIN option. Accordingly, the intermediate device 103 causes the router 105 to establish a direct data transfer connection with the server device 102.

Subsequently, the intermediate device 103 may then withdraw itself from the data path connection between the router 105 and the server device 102. The intermediate device 103 may withdraw itself in different manners. For example, the intermediate device 103 may issue a TCP segment comprising a so-called REMOVE-ADDR option, which specifies an IP address to be removed. The intermediate device 103 directs such a TCP segment to the router 105 and another one to the server device 102. Upon reception of the TCP segment with the REMOVE-ADDR option, the router 105 will stop using the IP address that is specified in this option as a possible destination for TCP segments in the data transfer connection concerned. Similarly, upon reception of the TCP segment with the REMOVE-ADDR option, the server device 102 will stop using the IP address that is specified in this option as a possible destination.

As another example, the intermediate device 103 may issue a TCP segment comprising a so-called MP-PRIO option, which specifies an IP address that should be used only as a backup to which a sub-flow of TCP segments may be directed. The intermediate device 103 directs such a TCP segment to the router 105 and another one to the server device 102. Upon reception of the TCP segment with the MP-PRIO option, the router 105 will no longer actively use the IP address that is specified in this option as a possible destination for TCP segments in the data transfer connection concerned. The IP address will be used if no other possible destination is available. Similarly, upon reception of the TCP segment with MP-PRIO option, the server device 102 will no longer actively use the IP address that is specified in this option as a possible destination.

In case the MP-PRIO option is used, the router 105 and the server device 102 do not actually terminate their respective data path connections with the intermediate device 103. Rather, these data path connections are maintained in a backup mode. This implies that the router 105 and the service device should continue carrying out operations for this backup mode maintains, which may be a waste of resources. However, the MP-PRIO may be advantageous in case there is a relatively long delay before the direct, multipath-enabled data transfer connection between the router 105 and the server device 102 has been established and can effectively be used for data transfer. Namely, the data transfer may still continue via the intermediate device 103 during this delay.

It may be advantageous to combine use of the REMOVE-ADDR option and use of the MP-PRIO option for withdrawing the intermediate device 103 from the data transfer connection between the router 105 and the server device 102. The intermediate device 103 may first send the TCP segments with the MP-PRIO option to the router 105 and the server device 102 as described hereinbefore. After some delay, which may be predefined, the intermediate device 103 may then send the TCP segments with the REMOVE-ADDR option. The aforementioned delay is preferably such that there is a high probability, or even a certainty, that the direct, multipath-enabled data transfer connection between the router 105 and the server device 102 has been established. That is, the TCP segments with the REMOVE-ADDR option are preferably sent once the intermediate device 103 is no longer necessary for a data transfer between the router 105 and the server device 102.

Many aspects of the method and the operations described hereinbefore apply in case a client device 101 that is MPTCP capable seeks to establish a data transfer connection with the server device 102 illustrated in FIG. 1. That is, referring to FIG. 1, the client device 101, which is not MPTCP capable, and the router 105, which is MPTCP capable, may be replaced by an MPTCP capable device without this affecting much of what has been explained hereinbefore.

An MPTCP capable device may be, for example, in the form of a smart phone that has several communication interfaces. For example, a smart phone may have a 3G/4G interface and a WiFi interface. The smart phone may use both these interfaces for data transfer period. The smart phone may thus take the place of the client device 101 and the router 105 illustrated in FIG. 1. In that case, the 3G/4G interface may provide the first physical communication link 107; the WiFi interface may provide the second physical communication link 108.

An MPTCP capable client device 101, which substitutes the client device 101 and the router 105 illustrated in FIG. 1, may then issue an indirect connection request 212 as described hereinbefore, which is directed to the intermediate device 103. In effect, the MPTCP capable client device 101 may systematically issue an indirect connection request 212 when this client device 101 seeks to establish a data transfer connection with a server device 102. That is, the MPTCP capable client device 101 may systematically involve the intermediate device 103 in establishing this data transfer connection. Accordingly, the MPTCP capable client device 101 can effectively benefit from several physical communication links that provide connection to the Internet 104, even when the server device 102 is not MPTCP capable. For example, the aforementioned smart phone can effectively use both its interfaces, 3G/4G as well as WiFi, for data transfers with the server device 102 that is not MPTCP capable. As mentioned hereinbefore, this allows increased resilience and increased throughput, that is, a connection that is more reliable and faster.

Similar what has been described hereinbefore with regard to the router 105, the MPTCP capable client device 101 places one of its IP addresses in the source address field of the indirect connection request 212. The destination address field specifies the IP address 111 of the intermediate device 103. The router 105 places the IP address 113 of the server device 102 in the specific field of the indirect connection request 212 that is known by the intermediate device 103 to comprise an indication of a target entity. This specific field may also specify the destination port in the server device 102. As mentioned hereinbefore, the specific field that comprises the indication of the target entity can be in located the SYN segment of the indirect connection request 212.

There are various manners of embedding in a SYN segment an indication of a target entity with which a data transfer connection should be established. For example, this indication, which includes the IP address 113 of the server device 102 and the destination port, can be specified in a TCP option field. TCP provides that a SYN segment may comprise an option field of 320 bits maximum, which corresponds to 40 octets maximum. The option field may specify one or more options among a set of predefined kind of options. An option can be specified by means of a string of octets: an octet specifying option kind, an octet specifying option length, and one or more octets specifying option data. TCP allows for a definition of an option of a particular kind. It is thus possible to define a destination option that comprises, as the option data, the indication of the target entity in term of its IP address and the destination port.

Figure 5:
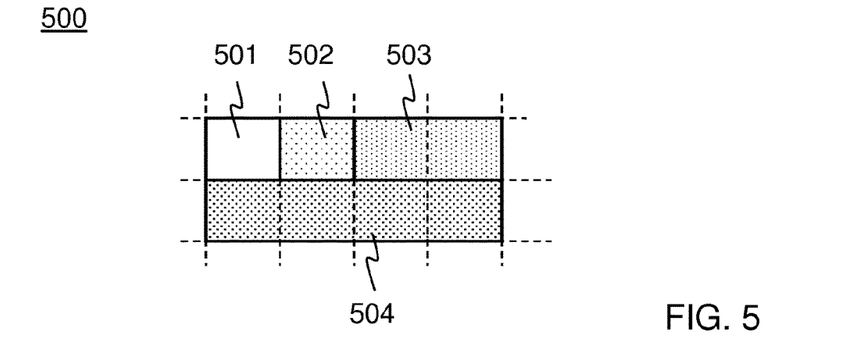
FIG. 5 is a conceptual diagram that illustrates a destination option that can be included in an option field of a header of a connection request.

FIG. 5 schematically illustrates a destination option 500 that can be comprised in a header of a SYN segment. The destination option 500 is represented by a matrix that comprises two rows and four columns. A row represents a data word that comprises 32 bits. A column represents an octet, a string of 8 bits, within a data row.

The destination option 500 comprises a first octet 501 indicating that this option specifies a destination. This implies that the first octet 501 has a value that is a reserved for indicating "destination" as the option kind. A second octet 502 indicates that the destination option 500 has a total length of 8 octets. A third and fourth octet 503 define a destination port as a 16-bit integer. The destination port may thus be defined in a manner similar to that in which the destination port is defined in the header of a SYN segment. The fifth to eight octets 504 indicate an IP address: the IP address of the destination. In this example, 32 bits are thus available to express the IP address. This implies that the IP address is of the "v4" type.

In principle, it is possible to specify an IP address of the "v6" type in a destination option by making the destination option sufficiently long, that is, longer than the 8 octets in the example described hereinbefore with reference to FIG. 2. However, in case a SYN segment comprises the MP_CAPABLE option, 32 of the 40 available octets in the option field are already used. There are only 8 octets left for an additional option, such as the destination option 500 described hereinbefore. Consequently, in case a SYN segment comprises the MP_CAPABLE option, the SYN segment is constrained to specify an IPv4 address as the destination in the destination option 500 described hereinbefore, which is included in the option field of the header.

There is another manner of embedding in the SYN segment an indication of the target entity with which the data transfer connection should be established. The SYN segment comprises a payload section in addition to the header. The aforementioned indication, which includes the IP address 113 of the server device 102 and the destination port, can be specified in the payload section. In principle, there is no constraint as to the version of the IP address that can be specified. That is, an IPv6 address can be specified in the payload section of a SYN segment that comprises the MP_CAPABLE option in the option field of its header.

Figure 6:
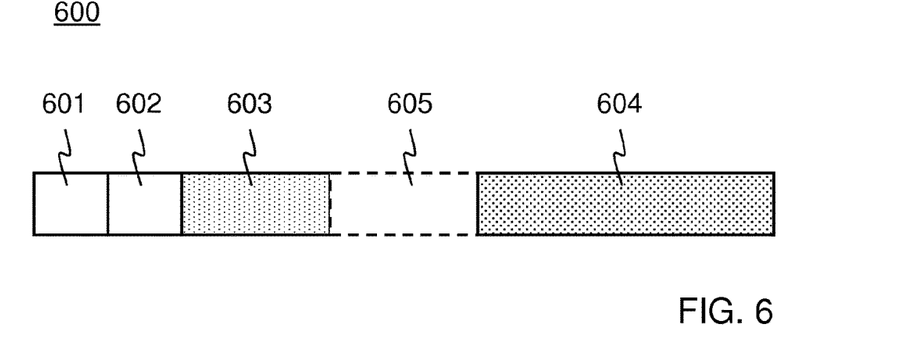
FIG. 6 is a conceptual diagram that illustrates a payload section of a connection request.

FIG. 6 schematically illustrates a payload section 600 of a SYN segment, which comprises an indication of the target entity. The payload section 600 comprises various data fields: a version identification field 601, an IP version identification field 602, a port definition field 603, and an IP address specification field 604. The payload section 600 may additionally comprise a token field 605. The version identification field 601 provides an indication that the payload section 600 is structured as illustrated in FIG. 6. This structure can be regarded as a particular version of the payload section 600 among several different possible versions. The IP version identification field 602 indicates a version that is used to specify an IP address of the target entity.

The port definition field 603 may define a destination port as a 16-bit integer, in a manner similar which may be to that in which the destination port is defined in the header of a SYN segment. The IP address specification field 604 specifies the IP address of the target entity. This field has a length that depends on the version that is used to specify the IP address. That is, the length of the IP address specification field 604 can be deduced from the version that is indicated in the IP version identification field 602. The token field 605, which may be optional, may specify an identification token that can be used to authenticate the data transfer connection that is to be established. For example, the identification token may be generated on the basis of a secret shared between entities involved in establishing the data transfer connection, such as, for example, the intermediate device 103 illustrated in FIG. 2.

An indirect connection request as described hereinbefore may be used in applications other than enabling multipath connections. In general, the indirect connection request allows an intermediate device in a data transfer connection to be explicit. That is, two entities between which the data transfer connection extends are aware, as it were, that the intermediate device is present in this connection. This can help in solving problems that are caused by, for example, bad interactions between devices that are present in a data transfer connection.

Notes

The detailed description hereinbefore with reference to the drawings is merely an illustration of the invention and the additional features, which are defined in the claims. The invention can be implemented in numerous different ways. In order to illustrate this, some alternatives are briefly indicated.

The invention may be applied to advantage in numerous types of methods or products related to data transfer according to a protocol. The data transfer need not necessarily involve the Internet as described hereinbefore by way of example. The data transfer may involve other types of communication networks. Similarly, the protocol need not necessarily be TCP with its multipath extension MPTCP as described hereinbefore by way of example. In principle, the protocol may be any protocol that has an extension. Moreover, the extension of the protocol need not necessarily be a multipath extension.

There are numerous different ways in which an intermediate device can determine whether a targeted device is capable of handling the multipath extension. The intermediate device need not necessarily systematically issue a connection request to the targeted device. For example, the intermediate device may store information on whether the targeted device is capable of handling the multipath extension, or not. This information may be obtained through analysis of an acknowledgment received in response to a connection request as described hereinbefore. The intermediate device may then store the information thus obtained for use in a subsequent determination. As another example, information on whether a particular device is multipath capable, or not, may be obtained from another device, which collects such information. Such information may be broadcasted throughout a communication network of which the intermediate device forms part.

The term "device" should be understood in a broad sense. The term may embrace any entity that is capable of sending data, or of receiving data, or both.

The term "address" should be understood in a broad sense. The term may embrace any type of indication that can designate a destination entity. For example, the term may embrace an IPv4 address, an IPv6 address, as well as a destination port, or any combination thereof.

In general, there are numerous different ways of implementing the invention, whereby different implementations may have different topologies. In any given topology, a single module may carry out several functions, or several modules may jointly carry out a single function. In this respect, the drawings are very diagrammatic. There are numerous functions that may be implemented by means of hardware or software, or a combination of both. A description of a software-based implementation does not exclude a hardware-based implementation, and vice versa. Hybrid implementations, which comprise one or more dedicated circuits as well as one or more suitably programmed processors, are also possible. For example, various functions described hereinbefore with reference to the figures may be implemented by means of one or more dedicated circuits, whereby a particular circuit topology defines a particular function.

The remarks made hereinbefore demonstrate that the detailed description with reference to the drawings is an illustration of the invention rather than a limitation. The invention can be implemented in numerous alternative ways that are within the scope of the appended claims. All changes that come within the meaning and range of equivalency of the claims are to be embraced within their scope. Any reference sign in a claim should not be construed as limiting the claim. The word "comprising" does not exclude the presence of other elements or steps than those listed in a claim. The word "a" or "an" preceding an element or step does not exclude the presence of a plurality of such elements or steps. The mere fact that respective dependent claims define respective additional features, does not exclude combinations of additional features other than those reflected in the claims.

The invention claimed is:

1. A method of establishing a data transfer connection between a device and another device using a basic protocol having a multipath extension that allows for the data transfer connection to use several different paths in parallel, the method involving an intermediate device that carries out:
   a reception step in which the intermediate device receives a connection request from the device, the connection request comprising:
      an indication that the device is capable of handling the multipath extension;
      a destination field that specifies an address of the intermediate device;
      a field other than the destination field that comprises an address of the other device with which the data transfer connection is to be established;
   a determination step in which the intermediate device determines whether the other device is capable of handling the multipath extension, or not;
   a connection establishment step in which the intermediate device establishes the data transfer connection in accordance with the multipath extension if the other device is capable of handling the multipath extension and, if not, in which the intermediate device establishes the data transfer connection as a concatenation of two data transfer connection portions:
      a multipath-enabled data transfer connection portion between the device and the intermediate device in accordance with the multipath extension; and
      a basic data transfer connection portion between the intermediate device and the other device in accordance with the basic protocol.

2. A method of establishing a data transfer connection according to claim 1, wherein the determination step comprises two sub-steps:
   a connection request issuance sub-step in which the intermediate device transmits to the other device a subsequent connection request comprising an indication that the intermediate device is capable of handling the multipath extension; and
   an acknowledgment analysis sub-step in which the intermediate device, upon reception of an acknowledgment from the other device, determines whether the acknowledgment comprises an indication that the other device is capable of handling the multipath extension, or not.

3. A method of establishing a data transfer connection according to claim 1, wherein, in case the other device is capable of handling the multipath extension, the intermediate device carries out:
   a withdrawal step in which the intermediate device withdraws itself from the data transfer connection that has been established between the device and the other device.

4. A method of establishing a data transfer connection according to claim 1, wherein the basic protocol is a standardized protocol known as Transmission Control Protocol (TCP), with a multipath extension known as Multipath Transmission Control Protocol (MPTCP).

5. A method of establishing a data transfer connection according to claim 4, wherein the connection request comprises a SYN segment, the intermediate device retrieving the identification of the other device from an option field in a header of the SYN segment.

6. A method of establishing a data transfer connection according to claim 4, wherein the connection request comprises a SYN segment, the intermediate device retrieving the identification of the other device from a data field in a payload section of the SYN segment.

7. A method of establishing a data transfer connection according to claim 4, wherein, in case the other device is not capable of handling MPTCP, the intermediate device carries out:

a port provision step in which the intermediate device provides an MPTCP communication port for the multipath-enabled data transfer connection portion with the device, and in which the intermediate device provides a TCP communication port for the basic data transfer connection portion with the other device;

a data forwarding step in which payload data received at the MPTCP communication port is transferred to the TCP communication port, and vice versa.

8. A method of establishing a data transfer connection according to claim 5, wherein the determination step comprises two sub-steps:

a SYN transmission sub-step in which the intermediate device transmits a SYN segment to the other device, the SYN segment having a header comprising an option field that provides the indication that the intermediate device is capable of handling the multipath extension; and a SYN+ACK reception sub-step in which the intermediate device, upon reception of a SYN+ACK segment from the other device, determines whether the SYN+ACK has a header that comprises an option field with an indication that the other device is capable of handling the multipath extension, or not.

9. A method of establishing a data transfer connection according to claim 1, wherein the intermediate device is a server within a network infrastructure.

10. A computer program comprising a set of instructions that enables a processor, which is capable of executing the set of instructions, to carry out the method according to claim 1.

11. A processor adapted to carry out the method according to claim 1.

12. A method of generating a connection request enabling a device to establish a data transfer connection with another device according to a protocol, which defines that the connection request comprises various different fields, including a destination field that specifies an address to which the connection request is directed, the method comprising:

a target entity specification step in which a field of the connection request other than the destination field is provided with an address of the other device;

an intermediate device specification step in which the destination field is provided with an address of an intermediate device adapted to extract the address of the other device from the connection request and to generate a subsequent connection request that comprises the address of the other device in the destination field.

13. A method of generating a connection request as claimed in claim 12, wherein, in the target entity specification step, the field that is provided with the address of the other device is an option field in a header of the connection request.

14. A method of generating an connection request as claimed in claim 12, wherein, in the target entity specification step, the field that is provided with the address of the other device is a data field in a payload section of the connection request.

15. A method of generating a connection request according to claim 12, the method being carried out upon reception of an initial connection request from the device, the method comprising:

a retrieval step in which the address of the other device is retrieved from the destination field in the initial connection request so as to place this address in the field of the connection request other than the destination field.

16. A computer program comprising a set of instructions that enables a processor, which is capable of executing the set of instructions, to carry out the method according to claim 12.

17. A processor adapted to carry out the method according to claim 12.

* * * * *